Sept. 28, 1943.    A. TROSCH ET AL    2,330,529
VERTICAL BORING MILL
Filed Aug. 31, 1942    2 Sheets-Sheet 1
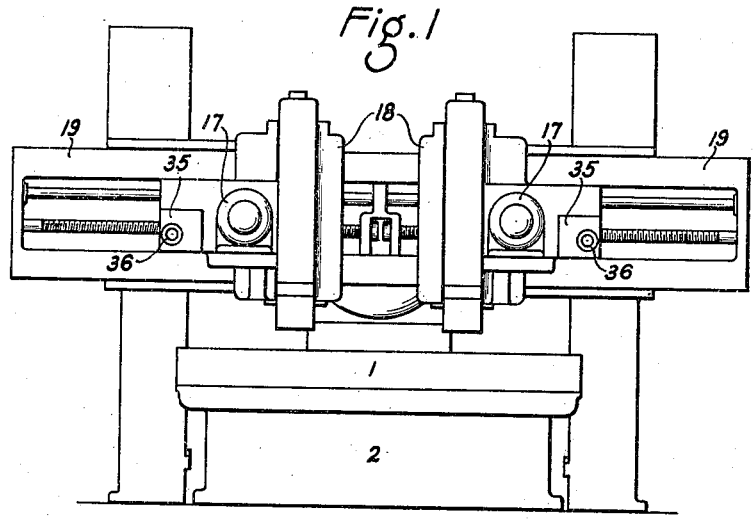
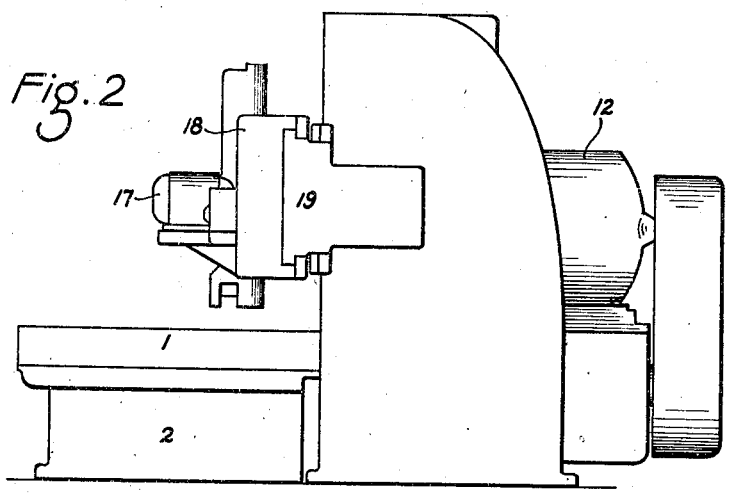
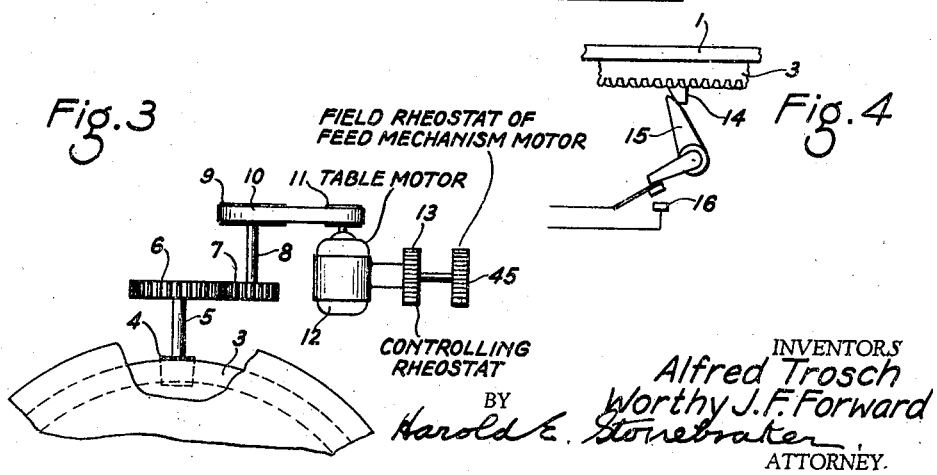
INVENTORS
Alfred Trosch
Worthy J. F. Forward
BY Harold E. Stonebraker
ATTORNEY.

Sept. 28, 1943.    A. TROSCH ET AL    2,330,529
VERTICAL BORING MILL
Filed Aug. 31, 1942    2 Sheets-Sheet 2
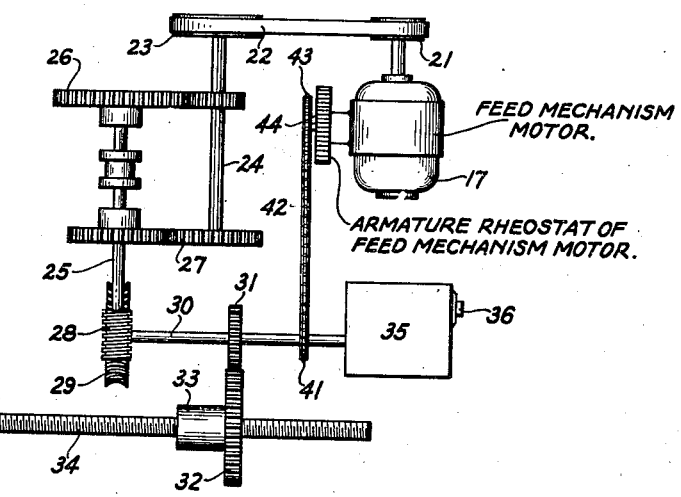
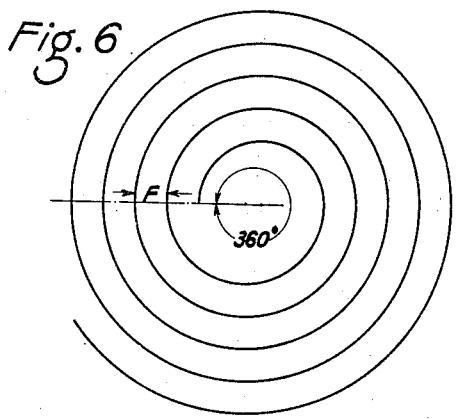
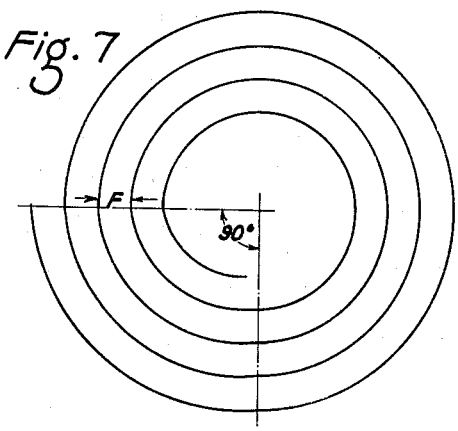
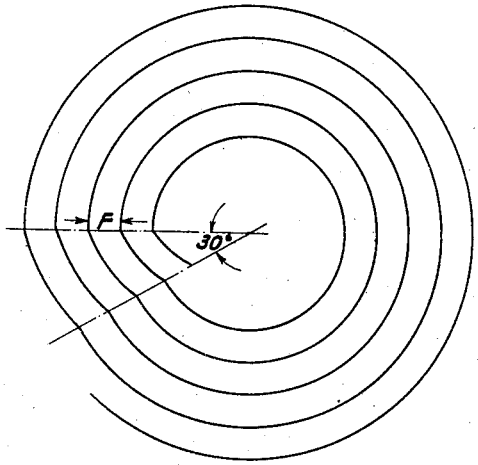
INVENTORS
Alfred Trosch
Worthy J. F. Forward
BY Harold E. Stonebraker
ATTORNEY.

Patented Sept. 28, 1943

2,330,529

UNITED STATES PATENT OFFICE 2,330,529

VERTICAL BORING MILL

Alfred Trosch, Brighton, and Worthy J. F. Forward, Rochester, N. Y., assignors to Consolidated Machine Tool Corporation, Rochester, N. Y., a corporation of Delaware Application August 31, 1942, Serial No. 456,778

10 Claims. (Cl. 29—29)

This invention relates to a vertical boring mill and method of controlling the same, with particular reference to the type of machine embodying a rotary horizontal work table, cross-rail, and a tool-head movable on the cross-rail through the instrumentality of feeding mechanism, and it has for its object to provide a method of controlling the feeding mechanism that enables handling the machine more readily and makes it possible for the operator to change the amount of feed as conditions require without stopping the machine and without leaving the tool-head or portion of the work where cutting takes place.

A further object of the invention is to provide a method and mechanism whereby the work table and tool-head feed mechanism are driven by separate variable speed electric motors and the feed mechanism motor automatically operated intermittently at each rotation of the table to effect a predetermined amount of feed that can be instantly changed by the operator who makes such adjustment or can vary the speed of the tool-head feed mechanism motor or the work table motor from a common point on the tool-head, and without the necessity of shifting his position to the end of the cross-rail as in the conventional machine for operating gear-change levers.

Another purpose of the invention is to provide an all electric control through which the tool-head feed mechanism is automatically started by movement of the work table, as for instance, at each rotation thereof, and is automatically stopped after a predetermined number of turns by an adjustable control unit, thus greatly facilitating the operation of the machine and increasing production.

An additional purpose of the invention is to eliminate the use of complicated and costly change gears, connecting shafts, and drive gearing, by utilizing separate variable speed electric motors for the work table and tool-head feed mechanism, effecting the necessary speed changes by varying the speeds of the work table and feed motors and thus producing a machine of simpler design with fewer parts than heretofore, and one which can be produced in considerably less time than the conventional machine in which all the moving parts are operated from a single motor and the required changes in feed and speed obtained by the operation of change gears.

Another object of the invention is to afford a vertical boring mill in which the feed mechanism motor is automatically started at regular intervals by the work table and automatically stopped after a predetermined adjusted number of turns, upon which depends the amount of feed at each intermittent operation, while the rate of feed is governed by the speed of the feed mechanism motor.

Still a further purpose of the invention is to afford a machine that operates accurately, which can be manufactured in less time and at a lower cost than prior designs, the simplicity of its structure effecting a reduction in the maintenance required, and the flexibility of its control enabling fast production.

Another purpose of the invention is to afford a construction in which the feed mechanism motor is operated for a predetermined period at each rotation of the work table dependent upon the number of turns of the feed motor before it is stopped, with provision for the operator instantly making the necessary adjustment to vary the amount of feed by changing the number of turns made by the feed motor before it stops, so that the operation of the feeding mechanism motor may continue through any portion of one complete cycle or rotation of the work table, irrespective of the speed at which the latter may be driven.

Still an additional object of the invention is to afford a vertical boring mill having an all electric control with a maximum feed range as wide as that of any conventional machine using change gears, and accomplishing this by an intermittently operated feed mechanism motor set in motion by the table at each rotation and stopping automatically after a predetermined number of turns before the table completes one rotation, coupled with interconnecting devices between the feed adjusting means, the table motor, and the feed mechanism motor whereby the speed of the feed mechanism motor is automatically changed in accordance with a change in speed of the table motor or an adjustment in the amount of feed, or by both.

To these and other ends, the invention consists in the method of operation and arrangement of parts that will appear clearly from the following description when read in conjunction with the accompanying drawings, the novel features being pointed out in the claims following the specification.

In the drawings:

Fig. 1 is a view in front elevation of a vertical boring mill incorporating a preferred embodiment of the invention;

Fig. 2 is an end elevation;

Fig. 3 is a diagrammatic view of the work table motor and drive to the work table;

Fig. 4 is a detail view of part of the work table;

Fig. 5 is a diagrammatic view of the feed mechanism motor and drive to the tool feed mechanism;

Fig. 6 is a diagram illustrative of the relation between a given amount of feed and the rate of feed when the feed mechanism motor operates continuously, or throughout the entire 360° of rotation of the work table;

Fig. 7 is a similar diagram showing the relation between the same amount of feed and the rate of feed, when the feed mechanism motor operates through 90° or one-quarter of a complete rotation of the work table, and Fig. 8 is a similar diagram showing the relation between the same amount of feed, and the rate of feed, when the feed mechanism motor operates through 30° or one-twelfth of a complete rotation of the work table.

Referring more particularly to the drawings, in which like reference numerals refer to the same parts throughout the several views, I designates the rotary horizontal work table suitably mounted on the bed 2, see Fig. 1, the table being provided with a bevel gear 3, see Fig. 3, which is engaged and driven by a bevel pinion 4 mounted on the shaft 5 that carries a gear 6 operated by pinion 7 on the shaft 8 which carries a pulley 9 driven by the belt 10 from the pulley 11 on the shaft of a variable speed D. C. electric motor 12.

Thus change gears between the table and table motor are unnecessary for a limited range of table speeds which can be obtained by varying the motor speed. Such change in the table motor speed is accomplished by manually adjusting the table motor controlling rheostat 13, as usual in the operation of this type of electric motor.

In order to permit the widest possible range in tool feed and have electric control of table speed and tool feed, the invention contemplates operation of the tool feed mechanism intermittently by the work table, preferably at each rotation of the latter. To accomplish this, the table I is provided with an arm or projection 14 that engages a pivoted lever 15 which carries a conventional limit switch 16, that closes the circuit to the feed mechanism motor each time the table completes one rotation and the lever 15 is depressed. After this, the feed mechanism motor continues to operate for a predetermined period of time less than required for one complete rotation of the work table, and until a preadjusted feed limit switch mechanism opens the feed mechanism motor circuit following a predetermined number of rotations of the feed mechanism motor.

The tool feed mechanism electric motor is shown at 17 and is mounted on the tool-head 18 which travels on the cross-rail 19, see Fig. 1. Referring to Fig. 5, the motor 17 is of the variable speed D. C. type and carries a pulley 21 from which a belt 22 drives the pulley 23 on shaft 24. The shaft 24 operates the shaft 25 either through the gears 26 for feeding, or through the gears 27 for a fast rapid traverse operation. Shaft 25 carrying the worm 28 that drives the worm wheel 29, shaft 30, and through the gear 31 drives the gear 32 on the nut 33, which is fixedly connected to the gear 32, and operates to turn on the stationary screw 34, and thereby advance the tool-head in one direction or the other on the cross-rail 19.

The gearing just described together with motor 17 are mounted on the tool-head and cause the latter to travel on the cross-rail along the screw 34 which is stationarily supported on the cross-rail. This is in contrast to the conventional operation in which the motor and driving gears are mounted at the end of the cross-rail instead of on the tool-head and turn the feed screw which engages a nut that is stationarily mounted on the tool-head. In the present structure, the feed mechanism motor and rapid traverse gears are mounted on the tool-head in order to enable the operator to change the feed if desirable and to effect the necessary cutting controls at a common point without having to go to the end of the cross-rail or shifting his position away from immediately adjacent the point of engagement between the tool and work.

In order to stop operation of the feed mechanism motor after a predetermined number of turns, the shaft 30 which carries gear 31 is extended and geared directly to a feed limit switch 35 that includes a manual controlling means in the form of a knob and adjustable dial 36. This feed limit switch is of conventional form such as manufactured by General Electric Company and operates to open the circuit to feed mechanism motor 17 after the shaft 30 has completed a predetermined number of turns corresponding of course to the number of turns of the motor 17. The length of time during which the tool feed mechanism motor 17 operates, or the number of turns of shaft 30 before the motor circuit is opened, is determined by the manual adjustment of the dial 36 of the feed limit switch. This dial is located on the tool-head and readily accessible to the operator, and without changing position or leaving the cutting point he can set it instantly for any required amount of feed at each complete rotation of the work table and he can also change the amount of feed without stopping the machine, the work table, or feed mechanism.

The feed rate or tool travel per unit of time is determined by the speed of the tool feed mechanism motor, and the feed, which refers to amount of metal removed or extent of tool travel per rotation of the work table, is determined by the setting of the feed limit switch which is adjusted to effect movement of the motor 17 for any selected number of turns, thus permitting the feed mechanism to continue operating through a maximum or minimum portion of a complete rotation of the work table, or any fractional portion thereof. This enables taking a very heavy cut, or a very thin cut, and gives the widest possible range of feed equal to that obtainable on the prior types of boring mill requiring many change gears to effect different feeds.

This relationship is illustrated by the diagrams in Figs. 6 to 8 inclusive, in which the path of the tool on the work is illustrated by the generally spiral line, the feed, or amount of metal removed which is greatly exaggerated for illustrative purposes, is indicated by the letter F, and the rate of feed, or tool travel per minute, is indicated by the portion of the work table rotation during which the feeding movement is completed.

Fig. 6 illustrates the relation when the feed mechanism operates substantially continuously or throughout practically one complete rotation of the work table. In this case, the feed limit switch control 36 would be set to permit the feed mechanism motor to continue operating until just before the dog 14 on the table engages the limit switch arm 15 to again close the circuit to the feed mechanism motor, there being no considerable interval between the opening and closing of the feed mechanism motor circuit.

This results in a practically continuous feeding movement of the tool effected by intermittent operation of the feeding mechanism and giving a spiral line such as shown in Fig. 6, while Fig. 7 shows the relation between the same amount of feed F or tool travel per rotation of table, and the rate of feed or tool travel per minute when the tool feed mechanism motor is operated through only 90° or one-quarter of a complete rotation of the work table. This is accomplished by setting the feed limit switch control 36 so that the feed mechanism motor circuit is opened by the limit switch when it has completed such number of rotations as to stop operation of the feed mechanism when the table has completed one-quarter of a complete turn.

To obtain the same amount of feed F as in Fig. 6 during one-quarter of a table rotation, the rate of feed must be four times as great, and such change of feed rate is accomplished by properly adjusting the speed of the feed mechanism motor 17.

By further increasing the speed of the feed mechanism motor 17, the same amount of feed F as in Figs. 6 and 7 can be effected through 30° or one-twelfth of a complete rotation of the work table, this relation being illustrated in Fig. 8, and it will be understood that the feed limit switch can be set to stop the feed mechanism motor and complete the feed within any fractional part of one complete cycle or rotation of the table.

For many operations requiring a heavy cut, it is desirable to have as nearly continuous feed as practical and therefore to operate the feed mechanism motor throughout as much of the cycle or complete rotation of the table as possible, whereas extremely thin cuts can be taken and a uniform smooth finish obtained and controlled to a nicety by operating the feed mechanism throughout only a small portion of a complete cycle or rotation of the table.

By the use of such an electrically controlled intermittent feed, it is possible to eliminate the costly and complicated change gears heretofore required in obtaining the various ranges of feed and also to mount the controlling mechanism on the tool-head, thus making it possible for the operator to effect changes in feed or speed instantly and readily, contributing in this manner to much faster production and also to more accurate work by relieving the operator from the necessity of having to leave the work where the tool is operating and go to the end of the cross-rail to operate the necessary feed change gear shift levers as in the past.

In order to insure the proper rate of feed under all conditions and to conserve the time of the operator to the greatest extent it is desirable to provide automatic means for varying the speed of the feed mechanism motor in accordance with adjustment of the feed limit switch or changes in the table motor speed.

To accomplish this, the adjusting dial 36 of the feed limit switch is connected through pulley 41, chain 42, and pulley 43 to an armature rheostat 44 which controls the armature voltage of the feed mechanism motor 17 and thus governs the speed of the latter. When the feed limit switch is adjusted manually to select a particular feed, such adjustment automatically operates the armature rheostat 44 of the feed mechanism motor and changes its speed although not necessarily in proportion to the change in setting of the feed limit switch. The desired control of the speed of the feed mechanism motor can be had in this way automatically to attain the best results for the selected feed.

Similarly the speed of the feed mechanism motor can be automatically regulated in accordance with a change in the speed of the table motor, and this is accomplished by connecting the conventional speed controlling rheostat 13 of the table motor 12 with a field rheostat 45 controlling the feed mechanism motor 17. The control of the speed of the latter is divided between an armature voltage rheostat and a field rheostat, the former being controlled by the feed limit switch as already described and the latter being controlled by the table motor rheostat so that when the operator adjusts the latter to obtain a change in speed of the table and work, it automatically causes a change in the speed of the feed mechanism motor. Such change is not necessarily proportional to the change in the table motor speed but is determined by the best results to be had in the feed mechanism from a given table speed.

The speed of the feed mechanism motor can thus be automatically controlled by either the table speed or the adjustment of the feed limit switch or both, and with this arrangement it is unnecessary for the operator to give attention to the speed of the feed mechanism motor. After he selects the desired table speed depending upon the character of the particular work, he need only determine the proper feed and make the necessary adjustment of the feed limit switch for changes in feed, all of which control operations can be performed on the tool-head immediately adjacent the point where cutting takes place.

With this structure it is possible for the operator to obtain any feed from an extremely thin cut to a very heavy cut; to change the feed at any time without stopping the machine, and to control the feed, or the speed of the table, without moving away from the tool-head and cutting point, while the proper speed of the feed mechanism motor is always assured by the automatic mechanism that keeps it in a fixed relation to the feed and table speed.

The structure has made possible substantial economies in the cost of building a boring mill of this type, has effected material savings in time in its operation, and has made possible more accurate and uniform work with less loss, or waste due to inaccurate operations, and considerably less servicing of the machine by reason of the great reduction in the number of moving parts used to perform the same operations.

While the invention has been described with reference to certain detailed arrangements, it is not confined to the precise structure shown herein, and this application is intended to cover such modifications or departures as may come within the purposes of the improvement or the scope of the following claims.

We claim:

1. In a vertical boring mill of the type embodying a horizontal work table rotatable in a horizontal plane about a vertical axis, a gear mounted on the work table, a pinion engaging said gear, speed reduction gearing operating said pinion, and an electric motor connected to the speed reduction gearing, the combination with a tool-head feed mechanism and a separate electric motor connected to the feed mechanism, of a circuit for the feed motor, a controlling switch in said circuit, means on the work table engaging said switch once at each rotation thereof acting to start the feed mechanism motor, and dial adjustable means controlled from the tool head and acting automatically after a predetermined number of turns of the feed mechanism motor acting to stop the same before the work table completes one rotation.

2. In a vertical boring mill of the type embodying a horizontal work table rotatable in a horizontal plane about a vertical axis, a gear mounted on the work table, a pinion engaging said gear, speed reduction gearing operating said pinion, and a variable speed electric motor connected to the speed reduction gearing, the combination with a tool-head feed mechanism and a separate variable speed electric motor connected to the feed mechanism, of a circuit for the feed motor, a controlling switch in said circuit, means on the work table engaging said switch once at each rotation thereof acting to start the feed mechanism motor, dial adjustable means controlled from the tool head and acting automatically after a predetermined number of turns of the feed mechanism motor to stop the same before the work table completes one rotation, and connecting means between said motors acting to vary the speed of the feed mechanism motor in accordance with changes in the speed of the table motor.

3. In a vertical boring mill of the type embodying a horizontal work table rotatable in a horizontal plane about a vertical axis, a gear mounted on the work table, a pinion engaging said gear, speed reduction gearing operating said pinion, and a variable speed electric motor connected to the speed reduction gearing, the combination with a tool-head feed mechanism and a separate variable speed electric motor connected to the feed mechanism, of a circuit for the feed motor, a controlling switch in said circuit, means on the work table engaging said switch once at each rotation thereof acting to start the feed mechanism motor, means acting automatically after a predetermined number of turns of the feed mechanism motor to stop the same before the work table completes one rotation, dial adjustable means on the tool head for varying the number of turns of the feed mechanism motor at each operation, and devices controlled by said dial adjustable means acting to change the speed of the feed mechanism motor in accordance with the number of turns thereof at each operation.

4. In a vertical boring mill of the type embodying a horizontal work table rotatable in a horizontal plane about a vertical axis, a gear mounted on the work table, a pinion engaging said gear, speed reduction gearing operating said pinion, and a variable speed electric motor connected to the speed reduction gearing, the combination with a tool-head feed mechanism and a separate variable speed electric motor connected to the feed mechanism, of a circuit for the feed motor, a controlling switch in said circuit, means on the work table engaging said switch once at each rotation thereof acting to start the feed mechanism motor, means acting automatically after a predetermined number of turns of the feed mechanism motor to stop the same before the work table completes one rotation, dial adjustable means for varying the number of turns of the feed mechanism motor at each operation, devices controlled by said dial adjustable means acting to change the speed of the feed mechanism motor in accordance with the number of turns thereof at each operation, and connecting means between said motors acting to vary the speed of the feed mechanism motor in accordance with changes in the speed of the table motor.

5. In a vertical boring mill of the type embodying a horizontal work table rotatable in a horizontal plane about a vertical axis, a gear mounted on the work table, a pinion engaging said gear, speed reduction gearing operating said pinion, and a variable speed electric motor connected to the speed reduction gearing, the combination with a tool-head feed mechanism and a separable variable speed electric motor connected to the feed mechanism, of a circuit for the feed motor, a controlling switch in said circuit, means on the work table engaging said switch once at each rotation thereof acting to start the feed mechanism motor, and dial adjustable means acting automatically to stop the feed mechanism motor after a predetermined variable number of turns thereof.

6. In a vertical boring mill of the type embodying a horizontal work table rotatable in a horizontal plane about a vertical axis, a gear mounted on the work table, a pinion engaging said gear, speed reduction gearing operating said pinion, and a variable speed electric motor connected to the speed reduction gearing, the combination with tool-head feed mechanism and a separate variable speed electric motor connected to the feed mechanism, of a circuit for the feed motor, a controlling switch in said circuit, means on the work table engaging said switch once at each rotation thereof acting to start the feed mechanism motor, means acting automatically after a predetermined number of turns of the feed mechanism motor to stop the same before the work table completes one rotation, and dial adjustable means located on the tool head for varying the number of turns of the feed mechanism motor at each rotation of the work table.

7. In a vertical boring mill, the combination with a horizontal work table rotatable in a horizontal plane about a vertical axis, a gear mounted on the work table, a pinion engaging said gear, speed reduction gearing operating said pinion, a variable speed electric motor connected to the speed reduction gearing, a cross-rail, and a tool-head movable on the cross-rail, of tool-head feed mechanism mounted on the tool-head and operative to move the tool-head on the cross-rail, a variable speed electric motor for the feed mechanism mounted on the tool-head, a circuit for the feed motor, a controlling switch in said circuit, means on the work table engaging said switch once at each rotation of the work table, and dial adjustable control means on the tool-head acting to stop the operation of the feed mechanism motor after a predetermined number of turns.

8. In a vertical boring mill, the combination with a horizontal work table rotatable in a horizontal plane about a vertical axis, a gear mounted on the work table, a pinion engaging said gear, speed reduction gearing operating said pinion, a variable speed electric motor connected to the speed reduction gearing, a cross-rail, and a tool-head movable on the cross-rail, of tool-head feed mechanism mounted on the tool-head and operative to move the tool-head on the cross-rail, a variable speed electric motor for the feed mechanism mounted on the tool-head, a circuit for the feed motor, a controlling switch in said circuit, means on the work table engaging said switch once at each rotation of the work table, dial adjustable control means on the tool-head acting to stop the operation of the feed mechanism motor after a predetermined number of turns, and devices actuated by said adjustable control means acting to change the speed of the feed mechanism motor in accordance with the number of turns thereof at each operation.

9. In a vertical boring mill, the combination with a horizontal work table rotatable in a horizontal plane about a vertical axis, a gear mounted on the work table, a pinion engaging said gear, speed reduction gearing operating said pinion, a variable speed electric motor connected to the speed reduction gearing, a cross-rail, and a tool-head movable on the cross-rail, of tool-head feed mechanism mounted on the tool-head and operative to move the tool-head on the cross-rail, a variable speed electric motor for the feed mechanism mounted on the tool-head, a circuit for the feed motor, a controlling switch in said circuit, means on the work table engaging said switch once at each rotation of the work table, dial adjustable control means on the tool-head acting to stop the operation of the feed mechanism motor after a predetermined number of turns, and connecting means between said motors acting to change the speed of the feed mechanism motor in accordance with changes in speed of the table motor.

10. In a vertical boring mill, the combination with a horizontal work table rotatable in a horizontal plane about a vertical axis, a gear mounted on the work table, a pinion engaging said gear, speed reduction gearing operating said pinion, a variable speed electric motor connected to the speed reduction gearing, a cross-rail, and a tool-head movable on the cross-rail, of tool-head feed mechanism mounted on the tool-head and operative to move the tool-head on the cross-rail, a variable speed electric motor for the feed mechanism mounted on the tool-head, a circuit for the feed motor, a controlling switch in said circuit, means on the work table engaging said switch once at each rotation of the work table, dial adjustable control means on the tool-head acting to stop the operation of the feed mechanism motor after a predetermined number of turns, devices actuated by said adjustable control means acting to change the speed of the feed mechanism motor in accordance with the number of turns thereof at each operation, and connecting means between said motors acting to change the speed of the feed mechanism motor in accordance with changes in speed of the table motor.

ALFRED TROSCH.
WORTHY J. F. FORWARD.